US012651974B2

(12) United States Patent
Facanha De Oliveira

(10) Patent No.: US 12,651,974 B2
(45) Date of Patent: Jun. 9, 2026

(54) AC-DC CONVERSION DEVICE AND VOLTAGE CONVERTER CIRCUIT

(71) Applicant: HUAWEI TECHNOLOGIES CO., LTD., Shenzhen (CN)

(72) Inventor: Eduardo Facanha De Oliveira, Nuremberg (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 182 days.

(21) Appl. No.: 18/598,821

(22) Filed: Mar. 7, 2024

(65) Prior Publication Data

US 2024/0213885 A1     Jun. 27, 2024

Related U.S. Application Data

(63) Continuation of application No. PCT/EP2021/078335, filed on Oct. 13, 2021.

(51) Int. Cl.
    *H02M 5/458*      (2006.01)
    *H02M 1/42*       (2007.01)
    *H02M 1/44*       (2007.01)

(52) U.S. Cl.
    CPC ....... *H02M 5/4585* (2013.01); *H02M 1/4283* (2021.05); *H02M 1/44* (2013.01)

(58) Field of Classification Search
    CPC ..... H02M 5/4585; H02M 1/4283; H02M 1/44
    See application file for complete search history.

(56) References Cited

U.S. PATENT DOCUMENTS

| | | | | |
|---|---|---|---|---|
| 7,719,240 B2 * | 5/2010 | Usui | ................... | H02M 1/4225 |
| | | | | 323/208 |
| 11,189,471 B2 * | 11/2021 | Kim | ..................... | H01J 37/3299 |
| 11,239,664 B2 * | 2/2022 | Tanaka | .................... | H02J 1/002 |

OTHER PUBLICATIONS

Xu et al., "Dual-output AC-DC converter with three-port bridgeless PFC and non-isolated DCX," IET Power Electronics, IET, UK, vol. 13, No. 15, XP006093418, pp. 3319-3327, IET The Institution of Engineering and Technology (Nov. 25, 2020).

* cited by examiner

*Primary Examiner* — Adolf D Berhane
(74) *Attorney, Agent, or Firm* — Leydig, Voit & Mayer, Ltd.

(57) ABSTRACT

The disclosure relates to an AC-DC conversion device for converting an alternating current (AC) voltage into a direct current (DC) voltage, the AC-DC conversion device including an AC input terminal for receiving an AC voltage and an AC-DC conversion stage being configured top convert the AC voltage into a first DC voltage, convert the AC voltage into a second DC voltage, and output the second DC voltage at an output of the AC-DC conversion device. The AC-DC conversion device further includes a partial power DC-DC converter configured to regulate the second DC voltage based on a required voltage across the output of the AC-DC conversion device. The disclosure further relates to a voltage converter circuit comprising such an AC-DC conversion device and an output for providing an isolated output voltage.

17 Claims, 12 Drawing Sheets

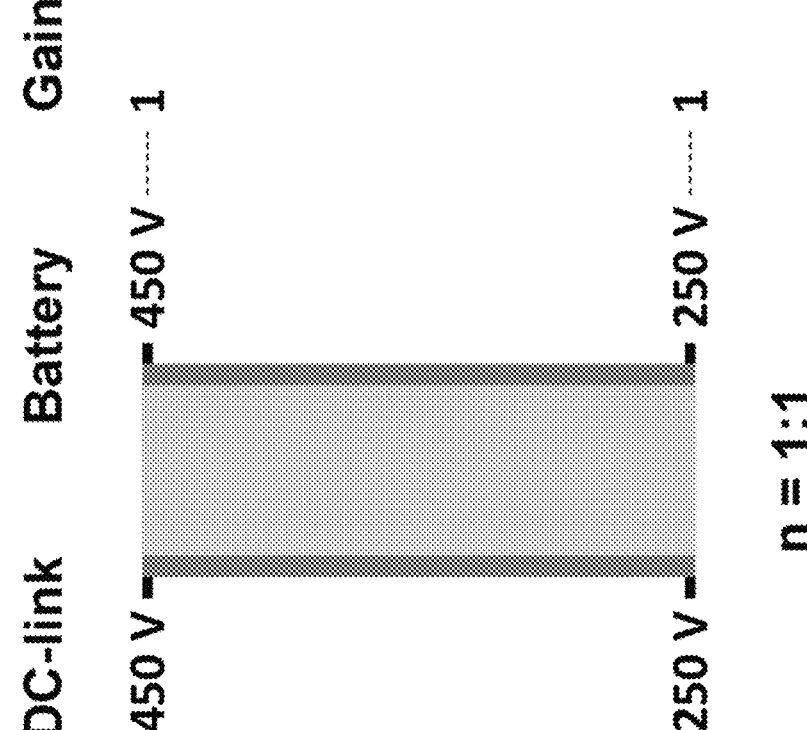
Figure 5
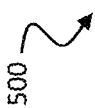

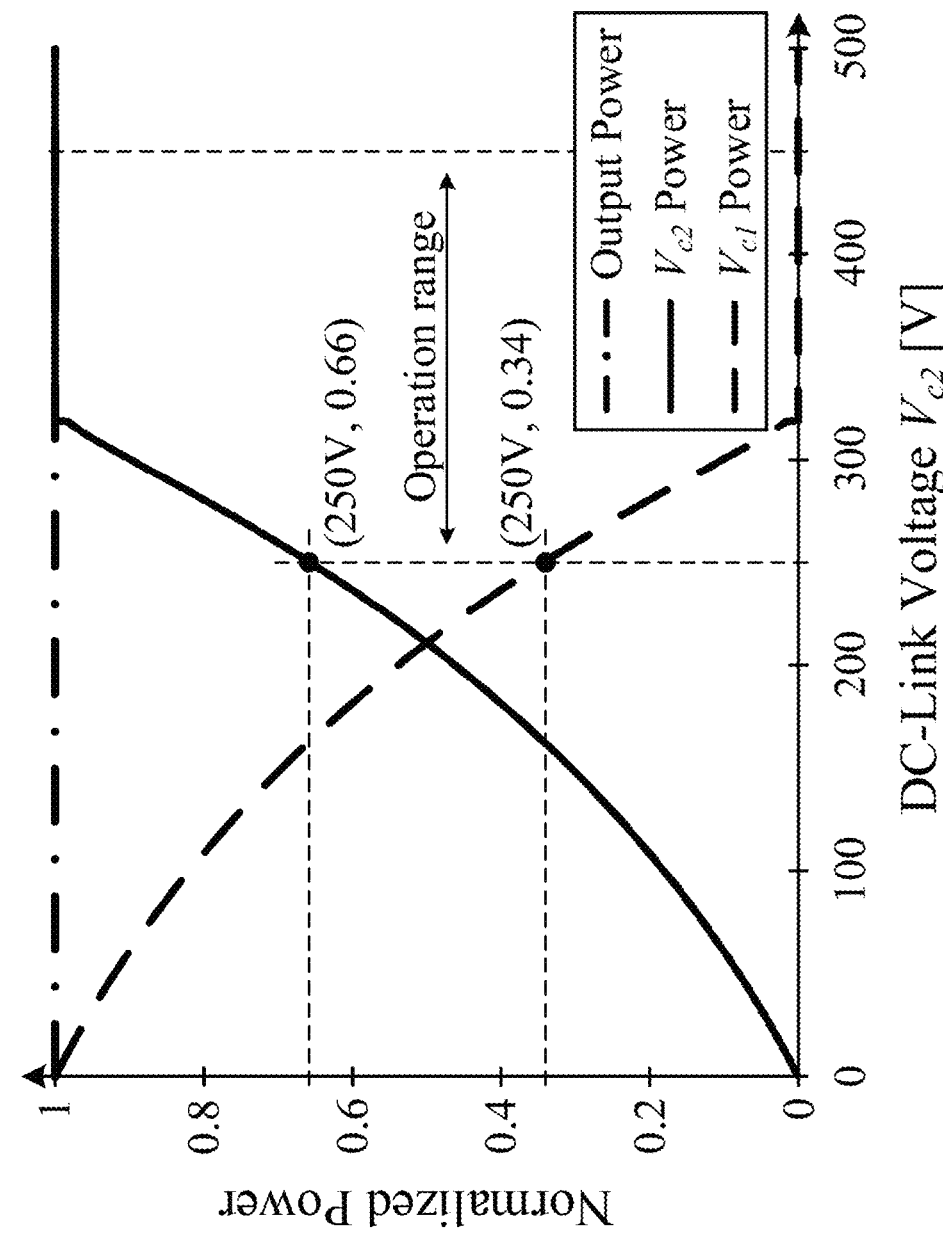
Figure 6

700

AC-DC CONVERSION DEVICE AND VOLTAGE CONVERTER CIRCUIT

CROSS-REFERENCE TO RELATED APPLICATIONS

This application is a continuation of International Application No. PCT/EP2021/078335, filed on Oct. 13, 2021, the disclosure of which is hereby incorporated by reference in its entirety.

TECHNICAL FIELD

The disclosure relates to an AC-DC conversion device and a voltage converter circuit for converting an alternating current (AC) voltage into a direct current (DC) voltage. In particular, the disclosure relates to the field of circuit topology for power converters, in particular AC/DC power converters. Specifically, this disclosure relates to an isolated AC/DC converter for applications like automotive on-board chargers (OBC), for example.

BACKGROUND

Some applications, like automotive on-board chargers (OBC), demand galvanic isolation between AC grid input and DC battery output due to safety reasons. The most common way to achieve it is using a two-stage system, composed by an AC/DC power factor correction (PFC) rectifier and an isolated DC/DC converter.

Regarding the isolated DC/DC stage, one of the preferred solutions is based on the LLC (or CLLC) resonant converter, due to its ability of achieving ZVS for all switches for a wide operation range. The PFC stage regulates the DC-link voltage at around 400 V followed by the isolated DC/DC converter regulating the output voltage and current using frequency modulation. In this way, the DC/DC's switching frequency needs to be swept within a certain range, depending on the resonant tank parameters.

In this solution, the best performance is achieved for switching frequencies close to the resonant frequency, at which condition the gain is unity. For battery charger application, because of the very wide battery voltage range, if DC-link voltage is constant, the gain range of CLLC resonant converter can be very large. To achieve this very wide gain range, switching frequency needs to be varied far from resonant frequency and the system efficiency drops quickly, mainly due to the higher amount of reactive power being processed by the components. Besides the lower efficiency, due to the wide frequency range, the design of the LLC transformer is not optimized, leading to larger size of the magnetic core and hence higher weight of the OBC.

SUMMARY

The present disclosure provides circuitry for an AC/DC power converter that can be applied for on-board chargers without the aforementioned disadvantages.

In particular, present disclosure provides a compact and highly efficient conversion device for AC-DC power conversion.

According to the embodiments of the disclosure a combination of the advantages of having DC-link voltages below 450 V, so that the use of 650 V semiconductors is feasible, and of using a fixed frequency DC/DC resonant converter with optimized transformer size and reduced losses without requiring a further full power conversion stage is used. For that, a quasi 5-level PFC rectifier with two distinct DC-links having different voltage levels is adopted. Depending on the phase angle of the sine wave, the converter will select the one out of the available DC-links that best matches the required output voltage levels, thus increasing the converter efficiency.

The disclosure describes a novel topology for a voltage converter circuit comprising a 5-level PFC rectifier with variable DC-link voltage associated to an isolated DC/DC converter as well as to a partial power DC/DC converter. In one embodiment, the system topology can be implemented by adopting a quasi 5-level PFC rectifier with common ground DC-link capacitors, a partial power Buck converter and a galvanically isolated fixed frequency series resonant converter (SRC).

The use of a series resonant converter (SRC) working at resonant frequency instead of frequency modulated CLLC offers the following advantages: a) open-loop operation without requiring any complex control; b) higher efficiency over the entire voltage range; c) simpler synchronous rectification, since secondary is always in phase with primary; d) smaller optimized transformer due to lower reactive power circulation; and e) resonant tank is only required on the primary side, due to good transformer coupling.

Another advantage is a lower current ripple at the AC side due to quasi 5-level operation can be achieved for most of the points.

The solution further allows a design for minimized power of the additional DC/DC converter, e.g., for 1:1 operation, $V_{c2}=V_{bat}$.

The solution provides a highly efficient symmetric 1:1 transformer design.

The solution further provides a design for minimized required DC-link capacitance due to DC/DC working as power decoupler, leading to a reduction of up to 77%.

In order to describe the disclosure in detail, the following terms, abbreviations and notations will be used:

OBC On-board Charger
PFC Power Factor Correction
DC direct current
AC alternating current
ZVS zero voltage switching
PWM Pulse Width Modulation
EMI Electro-Magnetic Interference
LLC filter network with two inductances L and one capacitance C
CLLC filter network with two inductances L and two capacitances C
SRC series resonant converter In this disclosure, converters, i.e., power converters are described. Power converters, also referred to as power electronics converters, are applied for converting electric energy from one form to another, such as converting between AC and DC or between DC and DC, e.g., between high or medium voltage DC and low voltage DC. Power converter can also change the voltage or frequency or some combination of these. Power electronics converter are based on power electronics switches that can be actively controlled by applying ON/OFF logic (i.e., PWM operation, usually commanded by a closed loop control algorithm).

In this disclosure, power factor correction (PFC) and PFC rectifiers are described. Power factor correction shapes the input current of off-line power supplies to maximize the real power available from the mains. Ideally, the electrical appliance should present a load that emulates a pure resistor, in which case the reactive power drawn by the device is zero. Inherent in this scenario is the absence of input current harmonics, i.e., the current is a perfect replica of the input voltage, usually a sine wave, and is exactly in phase with it. In this case the current drawn from the mains is at a minimum for the real power required to perform the needed work, and this minimizes losses and costs associated not only with the distribution of the power, but also with the generation of the power and the equipment involved in the process. Power factor correction is defined as the ratio of real power to apparent power, where the real power is the average, over a cycle, of the instantaneous product of current and voltage, and the apparent power is the product of the rms value of current times the rms value of voltage. If both current and voltage are sinusoidal and in phase, the power factor is 1.0. If both are sinusoidal but not in phase, the power factor is the cosine of the phase angle.

According to a first aspect, the disclosure relates to an AC-DC conversion device for converting an alternating current, AC, voltage into a direct current, DC, voltage, the AC-DC conversion device comprising: an AC input terminal for receiving an AC voltage; an AC-DC conversion stage being configured to: convert the AC voltage into a first DC voltage; convert the AC voltage into a second DC voltage; and output the second DC voltage at an output of the AC-DC conversion device; and a partial power DC-DC converter configured to regulate the second DC voltage based on a required voltage across the output of the AC-DC conversion device.

Such an AC-DC conversion device provides the advantage of a compact and highly efficient conversion device for AC-DC power conversion.

The AC-DC conversion device can be advantageously applied in a voltage converter circuit together with an isolated DC-DC resonant converter, such as a SRC operating at fixed frequency at the resonance as described below with respect to the second aspect. In particular for battery charger applications operating in a very wide battery voltage range, the AC-DC conversion device operates at high system efficiency. Due to the design of the AC-DC conversion device, the size of the magnetic core can be reduced and hence the weight of the OBC.

The required voltage across the output of the AC-DC conversion device can be a DC voltage set by an operator of the device, e.g., a DC voltage selected by the operator from one or more predefined DC voltage values. Alternatively, the required voltage across the output of the AC-DC conversion device can be a battery voltage of a battery connected to the AC-DC conversion device, e.g., a nominal voltage required by the battery. For example, the required output voltage 105a can be connected to the output 105 of the voltage converter circuit 100.

In an exemplary implementation of the AC-DC conversion device, the second DC voltage is equal to or smaller than the first DC voltage.

This provides the advantage that the maximum processed power by the partial power DC-DC converter can be a portion of the nominal power, e.g., about 34% in one example. No power needs to be processed by the partial power DC-DC converter from a certain output voltage level on, when the battery voltage is equal to or higher than the peak of the AC input voltage. This allows reduction of weight, in particular of the magnetic core of the AC-DC conversion device.

In an exemplary implementation of the AC-DC conversion device, the AC-DC conversion device comprises: a first DC terminal, a second DC terminal and a third DC terminal, wherein the first DC voltage is provided between the first DC terminal and the third DC terminal and the second DC voltage is provided between the second DC terminal and the third DC terminal.

This provides the advantage by using such three DC terminals, a 5-level PFC can be efficiently realized which increases efficiency of power conversion and allows reducing weight of the magnetics.

In an exemplary implementation of the AC-DC conversion device, the first DC voltage corresponds to a voltage across a first capacitor; wherein the second DC voltage corresponds to a voltage across a second capacitor; and wherein the partial power DC-DC converter is configured to regulate the second DC voltage across the second capacitor based on the first DC voltage across the first capacitor and the required voltage across the output of the voltage converter circuit.

This provides the advantage that the partial power DC-DC converter can efficiently regulate the output voltage by controlling the amount of charge flowing to the first capacitor with respect to the amount of charge flowing to the second capacitor.

In an exemplary implementation of the AC-DC conversion device, the first DC terminal is coupled via the first capacitor to the third DC terminal and the second DC terminal is coupled via the second capacitor to the third DC terminal.

This provides the advantage that a first configuration of the AC-DC conversion device implemented with common ground DC-link capacitors can be implemented. Using this configuration, a common ground can be used to simplify the circuit design.

In an exemplary implementation of the AC-DC conversion device, the first DC terminal is coupled via a third capacitor to the second DC terminal and the second DC terminal is coupled via the second capacitor to the third DC terminal.

This provides the advantage that a second configuration of the AC-DC conversion device implemented with split DC-link capacitors can be implemented. Using this configuration, two different capacitors at different potential can be implemented as an alternative circuit design.

In an exemplary implementation of the AC-DC conversion device, the AC-DC conversion device comprises: an inductor L1 coupled between a first internal node and a second internal node; an inductor L2 coupled between a third internal node and a fourth internal node; a diode D9 coupled between the second internal node and a fifth internal node; a diode D10 coupled between the fourth internal node and the fifth internal node; a switch S11 placed between the fifth internal node and the second DC terminal; a diode D1 coupled between the second internal node and the first DC terminal; a diode D3 coupled between the fourth internal node and the first DC terminal; a switch S2 placed between the second internal node and the third DC terminal; a switch S4 placed between the fourth internal node and the third DC terminal; a diode D6 coupled between the third DC terminal and the third internal node; and a diode D8 coupled between the third DC terminal and the first internal node.

By this configuration of the AC-DC conversion device, a 5-level topology can be realized. The second DC voltage at the output of the AC-DC conversion device can be reduced with respect to a 3-level topology.

In an exemplary implementation of the AC-DC conversion device, the partial power DC-DC converter comprises: a first terminal connected to the first DC terminal of the AC-DC conversion device; a second terminal connected to the second DC terminal of the AC-DC conversion device;

and a third terminal connected to the third DC terminal of the AC-DC conversion device.

This provides the advantage that two different configurations of the AC-DC conversion device can be implemented depending on the design requirements. A first configuration can be implemented with common ground DC-link capacitors and a second configuration with split DC-link capacitors.

In an exemplary implementation of the AC-DC conversion device, the partial power DC-DC converter comprises a step-down converter, the step-down converter comprising: an input connected between the first DC terminal and the third DC terminal; and an output connected between the second DC terminal and third DC terminal.

This provides the advantage that a step-down converter design has lower losses and hence higher efficiency than a step-up/step-down converter design described below.

In an exemplary implementation of the AC-DC conversion device, the partial power DC-DC converter comprises a step-up/step-down converter, the step-up/step-down converter comprising: an input connected between the first DC terminal and the second DC terminal; and an output connected between the second DC terminal and the third DC terminal.

This provides the advantage that in a step-up/step-down converter design, the capacitor C1 can be selected with a lower voltage class, since the voltage across it is lower ($V_{c1}=V_{dc}-V_{c2}$) compared to the previous step-down converter design ($V_{c1}=V_{dc}$).

According to a second aspect, the disclosure relates to a voltage converter circuit, comprising: an AC-DC conversion device according to the first aspect; and an output for providing an isolated output voltage based on the second DC voltage across the output of the AC-DC conversion device.

The galvanic isolation can be implemented by means of a series resonant converter (SRC) working at resonant frequency instead of a frequency modulated CLLC. offers the following advantages: a) open-loop operation without requiring any complex control; b) higher efficiency over the entire voltage range; c) simpler synchronous rectification, since secondary is always in phase with primary; d) smaller optimized transformer due to lower reactive power circulation; and e) resonant tank is only required on the primary side, due to good transformer coupling.

Such a voltage converter circuit provides the advantage of a compact and highly efficient conversion device for AC-DC power conversion. In particular for battery charger applications operating in a very wide battery voltage range, the voltage converter circuit operates at high system efficiency. Due to the design of the AC-DC conversion device as described above, the size of the magnetic core can be reduced and hence the weight of the OBC.

In an exemplary implementation of the voltage converter circuit, the voltage converter circuit comprises: a DC-DC conversion stage being configured to transfer energy from the output of the AC-DC conversion device to the output of the voltage converter circuit.

Such a voltage converter circuit provides the advantages of open-loop operation where no complex control is required; higher efficiency over the entire voltage range; simpler synchronous rectification, smaller optimized transformer due to lower reactive power circulation and good transformer coupling.

In an exemplary implementation of the voltage converter circuit, the DC-DC conversion stage is configured to operate in an open-loop mode without providing any regulation to the isolated output voltage, or in a closed-loop mode providing regulation to the isolated output voltage.

This provides the advantage of flexible configuration according to the design requirements. In the open-loop mode, fast power conversion can be achieved. In the closed-loop mode very precise power conversion can be achieved.

In an exemplary implementation of the voltage converter circuit, the DC-DC conversion stage comprises an isolated DC-DC converter, the isolated DC-DC converter comprising a primary side and a secondary side coupled via a transformer, wherein the primary side has an input connected to the output of the AC-DC conversion device; and wherein the secondary side has an output connected to the output of the voltage converter circuit for providing the isolated output voltage.

This provides the advantage of a robust implementation of the isolated DC-DC converter. Due to a good transformer coupling, the resonant tank is only required on the primary side, the second side is an optional component.

In an exemplary implementation of the voltage converter circuit, the voltage converter circuit comprises: an AC electromagnetic interference, EMI, filter coupled to the AC input terminal, the AC EMI filter being configured to suppress electromagnetic interference from the AC input terminal; and a DC EMI filter coupled to the output of the voltage converter circuit, the DC EMI filter configured to suppress electromagnetic interference from the output of the voltage converter circuit.

The AC EMI filter and the DC EMI filter can be efficiently used for cancelling undesired electro-magnetic disturbance to improve the performance of the voltage converter circuit.

According to a third aspect, the disclosure relates to a method for converting an alternating current, AC, voltage into a direct current, DC, voltage, using an AC-DC conversion device comprising an AC input terminal, an AC-DC conversion stage, and a partial power DC-DC converter, the method comprising: receiving the AC voltage at an AC input terminal of the AC-DC conversion device; converting the AC voltage into a first DC voltage by the AC-DC conversion device; converting the AC voltage into a second DC voltage by the AC-DC conversion device; outputting the second DC voltage at an output of the AC-DC conversion device; and regulating the second DC voltage by the partial power DC-DC converter based on a required voltage across the output of the AC-DC conversion device.

Such a method provides the advantage of an efficient operation for AC-DC power conversion. In particular for battery charger applications operating in a very wide battery voltage range, the method can achieve very high system efficiency. The method can be performed using AC-DC conversion devices which size of the magnetic core can be reduced. I.e., the method allows operation of low weight OBCs at high efficiency and reliability.

In an exemplary implementation of the method, the method comprises: providing an isolated output voltage at an output of a voltage converter circuit based on the second DC voltage across the output of the AC-DC conversion device.

This provides the advantage that a highly efficient symmetric 1:1 transformer design can be used. Additionally, a design with minimized required DC-link capacitance can be realized.

According to a fourth aspect, the disclosure relates to a computer program product including computer executable code or computer executable instructions that, when executed, causes at least one computer to execute the method according to the third aspect described above.

The computer program product may run on a controller or a processor for controlling the above-described AC-DC conversion device and/or the above-described voltage converter circuit.

According to a fifth aspect, the disclosure relates to a computer-readable medium, storing instructions that, when executed by a computer, cause the computer to execute the method according to the third aspect described above. Such a computer readable medium may be a non-transient readable storage medium. The instructions stored on the computer-readable medium may be executed by a controller or a processor.

BRIEF DESCRIPTION OF THE DRAWINGS

Further embodiments of the disclosure will be described with respect to the following figures, in which:

FIG. 5 shows a schematic diagram 500 illustrating an example of the operation voltages as well as required voltage gains for a voltage converter circuit according to the disclosure;

FIG. 6 shows a schematic diagram 600 illustrating an exemplary voltage operation range of a voltage converter circuit according to the disclosure;

DETAILED DESCRIPTION OF EMBODIMENTS

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the disclosure. The following detailed description, therefore, is not to be taken in a limiting sense, and the scope of the disclosure is defined by the appended claims.

It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1A:
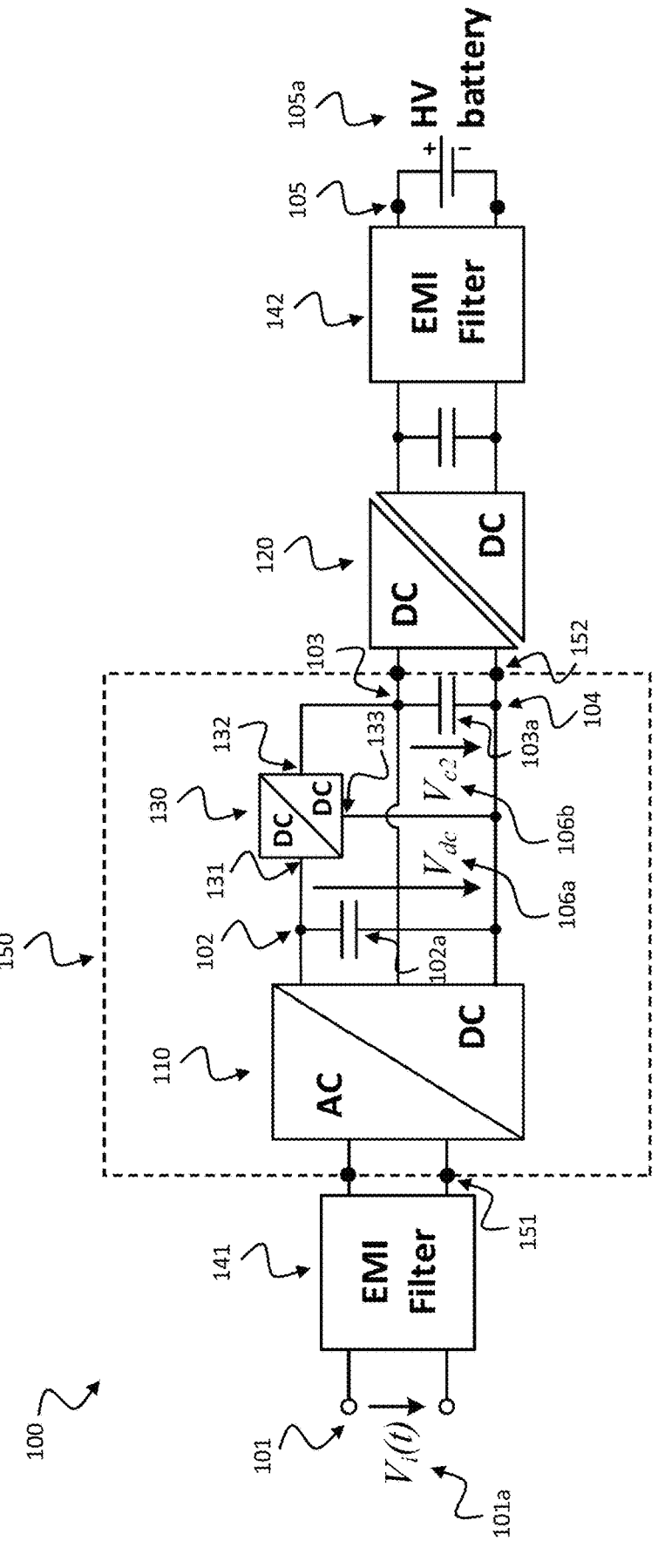
FIG. 1a shows a circuit diagram of a voltage converter circuit 100 according to a first embodiment.
Figure 1B:
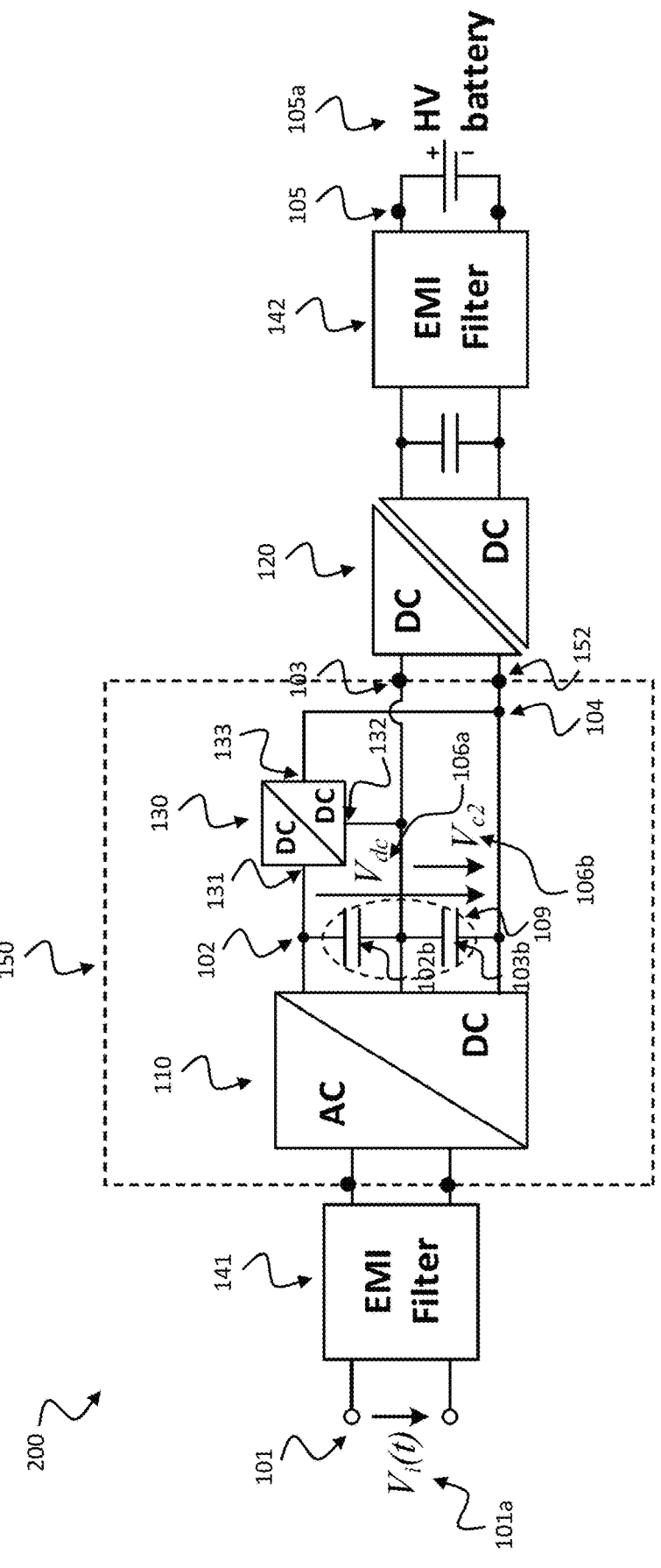
FIG. 1b shows a circuit diagram of a voltage converter circuit 200 according to a second embodiment.

The structure of the novel voltage converter circuit 100, 200 is depicted in FIGS. 1a and 1b. A first DC voltage $V_{dc}$ 106a is kept constant at around 400 V as an exemplary value, while a second DC voltage $V_{c2}$ 106b can assume any value between 0 and $V_{dc}$. The higher the value of $V_{c2}$, the higher the amount of power flowing to the second DC-link. Full power will be transferred to it if $V_{c2}$ is equal or higher than the peak of an AC voltage Vi(t) 101a.

Besides the PFC rectifier and the isolated DC/DC resonant converter stages, the voltage converter circuit 100, 200 comprises an additional partial power DC/DC converter, needed for exchanging power between the two DC-links. Depending on the design, most of the power can be transferred directly from the PFC stage to the DC/DC resonant converter stage, without needing to be processed by the additional partial power DC/DC converter.

FIG. 1a shows a circuit diagram of a voltage converter circuit 100 according to a first embodiment.

The voltage converter circuit 100 comprises an AC-DC conversion device 150 coupled via an AC electromagnetic interference, EMI, filter 141 to an AC input terminal 101 of the voltage converter circuit 100 for receiving the AC voltage Vi(t) 101a.

The voltage converter circuit 100 comprises a DC-DC conversion stage 120 configured to transfer energy from an output 152 of the AC-DC conversion device 150 to an output 105 of the voltage converter circuit 100. The output 105 provides an isolated output voltage 105a.

The AC EMI filter 141 is coupled to the AC input terminal 101. The AC EMI filter 141 is configured to suppress electromagnetic interference from the AC input terminal 101. The DC-DC conversion stage 120 is coupled via a DC EMI filter 142 to the output 105 of the voltage converter circuit 100. The DC EMI filter 142 is configured to suppress electromagnetic interference from the output 105 of the voltage converter circuit 100.

Both filters, AC EMI filter 141 and DC EMI filter 142 are optional components of the voltage converter circuit 100.

The AC-DC conversion device 150 is used for converting an AC voltage (which may be the AC voltage 101a depicted in FIG. 1a or the AC voltage 101a filtered by the AC EMI filter 141) into a DC voltage. The AC-DC conversion device 150 comprises: an AC input terminal 151 for receiving the AC voltage 101a; an AC-DC conversion stage 110; and a partial power DC-DC converter 130. In the following, the AC voltage 101a refers to both, the unfiltered AC voltage 101a as well as the AC voltage 101a filtered by the AC EMI filter 141 if such a filter is included.

The AC-DC conversion stage 110 is configured to: convert the AC voltage 101a into the first DC voltage $V_{dc}$ 106a; convert the AC voltage 101a into the second DC voltage $V_{c2}$ 106b; and output the second DC voltage 106b at an output 152 of the AC-DC conversion device 150.

The partial power DC-DC converter 130 is configured to regulate the second DC voltage 106b based on a required voltage across the output 152 of the AC-DC conversion device 150.

As described above, such a required voltage across the output of the AC-DC conversion device can be a DC voltage set by an operator of the device, e.g., a DC voltage selected by the operator from one or more predefined DC voltage values. Alternatively, the required voltage across the output of the AC-DC conversion device can be a battery voltage of a battery connected to the AC-DC conversion device, e.g., a nominal voltage required by the battery. For example, the required output voltage 105a can be connected to the output 105 of the voltage converter circuit 100.

The second DC voltage 106b can be equal to or smaller than the first DC voltage 106a.

The AC-DC conversion device 150 comprises: a first DC terminal 102, a second DC terminal 103 and a third DC terminal 104. The first DC voltage 106a is provided between the first DC terminal 102 and the third DC terminal 104 and the second DC voltage 106b is provided between the second DC terminal 103 and the third DC terminal 104.

The first DC voltage $V_{dc}$ 106a corresponds to a voltage across a first capacitor 102a as depicted in FIG. 1a. The second DC voltage 106b corresponds to a voltage across a second capacitor 103a as depicted in FIG. 1a.

The partial power DC-DC converter 130 can be configured to regulate the second DC voltage 106b across the second capacitor 103a based on the required voltage across the output 152 of the voltage converter circuit 150.

The partial power DC-DC converter 130 may be configured to regulate the second DC voltage 106b based on the required output voltage 105a connected to the output 105 of the voltage converter circuit 100.

The first DC terminal 102 is coupled via the first capacitor 102a to the third DC terminal 104. The second DC terminal 103 is coupled via the second capacitor 103a to the third DC terminal 104.

The partial power DC-DC converter 130 comprises a first terminal 131 connected to the first DC terminal 102 of the AC-DC conversion device 150; a second terminal 132 connected to the second DC terminal 103 of the AC-DC conversion device 150; and a third terminal 133 connected to the third DC terminal 104 of the AC-DC conversion device 150.

The DC-DC conversion stage 120 is configured to operate in an open-loop mode without providing any regulation to the isolated output voltage 105a, or in a closed-loop mode providing regulation to the isolated output voltage 105a.

The isolated output voltage 105a can be a battery voltage of a battery, e.g., a high-voltage (HV) battery for an electric vehicle. The battery can be connected via another capacitor to the DC-DC conversion stage 120 or via the optional DC EMI filter 142 and the other capacitor to the DC-DC conversion stage 120.

The DC-DC conversion stage 120 may comprise an isolated DC-DC converter with a primary side and a secondary side coupled via a transformer, e.g., as shown below with respect to FIGS. 3a, 3b, 4a and 4b. An input of the primary side can be connected to the output 152 of the AC-DC conversion device 150. An output of the secondary side can be connected to the output 105 of the voltage converter circuit 100 for providing the isolated output voltage 105a.

FIG. 1b shows a circuit diagram of a voltage converter circuit 200 according to a second embodiment.

The voltage converter circuit 200 is similar to the voltage converter circuit 100 according to the first embodiment described above with respect to FIG. 1a. However, the circuit configuration of the partial power DC-DC converter 130 is different and the capacitors are connected differently as described in the following.

The voltage converter circuit 200 comprises an AC-DC conversion device 150, a DC-DC conversion stage 120 and an optional AC EMI filter 141 and an optional DC EMI filter 142 as described above with respect to FIG. 1a.

The AC-DC conversion device 150 is used for converting an AC voltage into a DC voltage. The AC-DC conversion device 150 comprises: an AC input terminal 151 for receiving the AC voltage 101a; an AC-DC conversion stage 110; and a partial power DC-DC converter 130.

The AC-DC conversion stage 110 is configured to: convert the AC voltage 101a into a first DC voltage 106a; convert the AC voltage 101a into a second DC voltage 106b; and output the second DC voltage 106b at an output 152 of the AC-DC conversion device 150.

The partial power DC-DC converter 130 is configured to regulate the second DC voltage 106b based on a required voltage across the output 152 of the AC-DC conversion device 150.

The second DC voltage 106b can be equal to or smaller than the first DC voltage 106a.

The AC-DC conversion device 150 comprises: a first DC terminal 102, a second DC terminal 103 and a third DC terminal 104. The first DC voltage 106a is provided between the first DC terminal 102 and the third DC terminal 104 and the second DC voltage 106b is provided between the second DC terminal 103 and the third DC terminal 104.

The first DC voltage $V_{dc}$ 106a corresponds to a voltage across the series connection of a first capacitor 102b and a second capacitor 103b as depicted in FIG. 1b. The capacitance of the series connection is referred to as 109 in FIG. 1b. The second DC voltage $V_{c2}$ 106b corresponds to a voltage across the second capacitor 103b as depicted in FIG. 1b.

The partial power DC-DC converter 130 can be configured to regulate the second DC voltage $V_{c2}$ 106b across the second capacitor 103b based on the required voltage across the output 152 of the voltage converter circuit 150.

The partial power DC-DC converter 130 may be configured to regulate the second DC voltage 106b based on the required output voltage 105a connected to the output 105 of the voltage converter circuit 100.

The first DC terminal 102 is coupled via the first capacitor 102b to the second DC terminal 103. The second DC terminal 103 is coupled via the second capacitor 103b to the third DC terminal 104.

The partial power DC-DC converter 130 comprises a first terminal 131 connected to the first DC terminal 102 of the AC-DC conversion device 150; a second terminal 132 connected to the second DC terminal 103 of the AC-DC conversion device 150; and a third terminal 133 connected to the third DC terminal 104 of the AC-DC conversion device 150.

The DC-DC conversion stage 120 is configured to operate in an open-loop mode without providing any regulation to the isolated output voltage 105a, or in a closed-loop mode providing regulation to the isolated output voltage 105a.

As described above with respect to FIG. 1a, the isolated output voltage 105a can be a battery voltage of a battery, e.g., a high-voltage (HV) battery for an electric vehicle. The battery can be connected via another capacitor to the DC-DC conversion stage 120 or via the optional DC EMI filter 142 and the other capacitor to the DC-DC conversion stage 120.

As described above with respect to FIG. 1a, the DC-DC conversion stage 120 may comprise an isolated DC-DC converter with a primary side and a secondary side coupled via a transformer, e.g., as shown below with respect to FIGS. 3a, 3b, 4a and 4b. An input of the primary side can be connected to the output 152 of the AC-DC conversion device 150. An output of the secondary side can be connected to the output 105 of the voltage converter circuit 100 for providing the isolated output voltage 105*a*.

Figure 2:
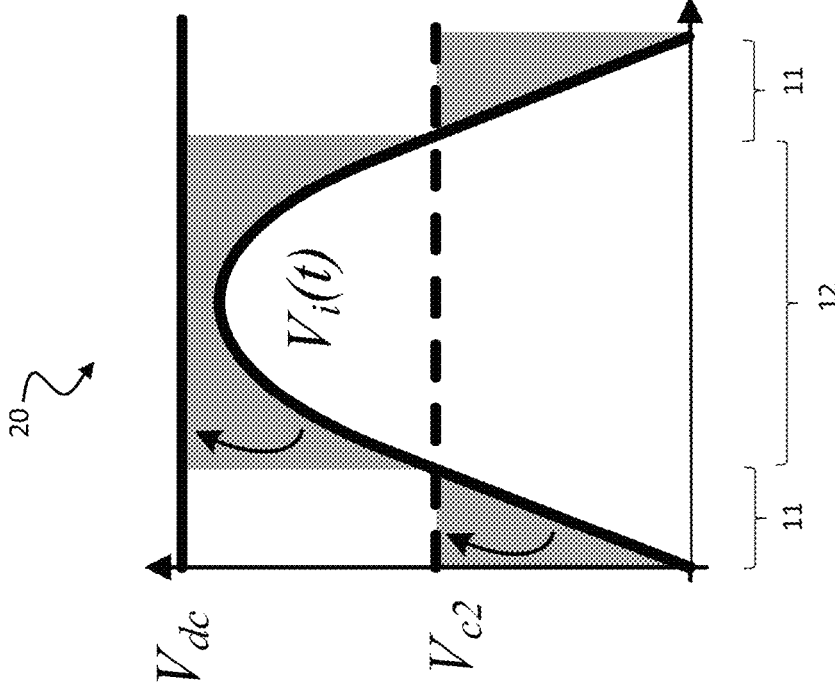
FIG. 2 shows schematic diagrams 10, 20 illustrating the principle of voltage conversion when using a single positive voltage level $V_{dc}$ (10) and when using two positive voltage levels $V_{dc}$ and $V_{c2}$ (20) according to the first and second embodiments.
Figure 2:
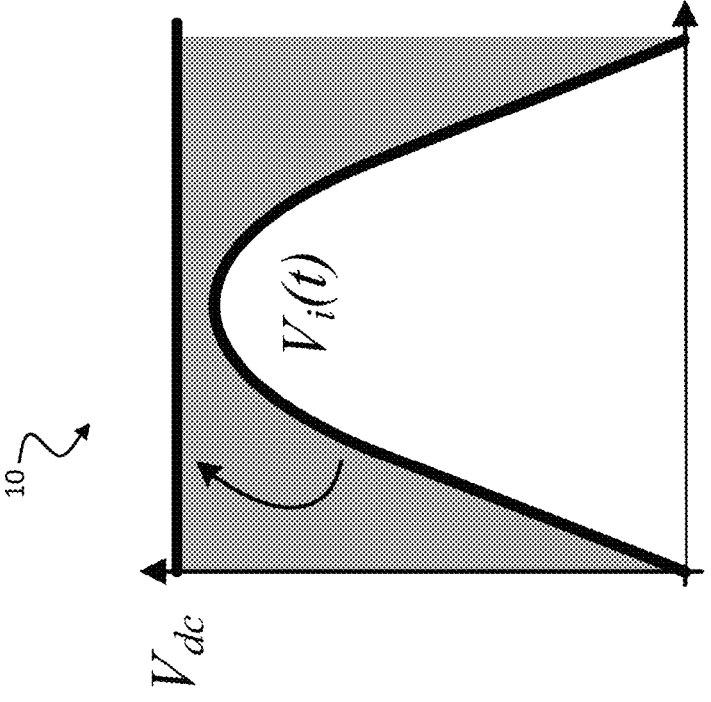

FIG. 2 shows schematic diagrams 10, 20 illustrating the principle of voltage conversion when using a single positive voltage level $V_{dc}$ (10) and when using two positive voltage levels $V_{dc}$ and $V_{c2}$ (20) according to the first and second embodiments.

The novel converter circuit combines the advantages of having DC-link voltages below 450 V (so that the use of 650 V semiconductors is feasible) and of using a fixed frequency DC/DC resonant converter (with optimized transformer size and reduced losses), without requiring a further full power conversion stage.

For that, a quasi 5-level PFC rectifier with two distinct DC-links having different voltage levels is adopted. Depending on the phase angle of the sine wave as depicted in the diagram 20, the converter will select the one out of the available DC-links that best matches the required output voltage levels, thus increasing the converter efficiency.

The arrangement with variable DC-link voltage allows adoption of a high efficient and compact fixed frequency SRC, instead of a frequency modulated CLLC resonant converter. In the conventional way (see left-hand diagram 10), voltage conversion is performed by using a single positive voltage level $V_{dc}$ (10) while the first 100 and second 200 embodiments described above with respect to FIGS. 1*a* and 1*b* apply voltage conversion by using two positive voltage levels $V_{dc}$ and $V_{c2}$ (20) (see right-hand diagram 20).

Unlike the conventional method, the novel voltage converter circuit according to the disclosure presents both DC-links below 450 V, requiring the use of 650 V devices. Moreover, the presented solutions only solve the issue with the reduced efficiency due to the low modulation index, but also improve it in comparison to conventional PFC rectifiers with fixed DC-link voltage of 400 V. It comprises two distinct DC-links having different voltage levels and depending on the phase angle of the sine wave 11, 12 (see right-hand diagram 20), the converter will select the one out of the available DC-links that best matches the required output voltage levels, increasing therefore the modulation index and the converter efficiency as shown in FIG. 2.

The additional DC/DC converter (i.e., partial power DC-DC converter 130 shown in FIGS. 1*a* and 1*b*) is responsible for transferring the energy from the first DC-link to the second DC-link, which is the input of the isolated DC/DC converter (i.e., DC-DC conversion stage 120 in FIGS. 1*a* and 1*b*). Since most of the power can be transferred directly from the PFC (i.e., AC-DC conversion stage 110 shown in FIGS. 1*a* and 1*b*) to the isolated DC/DC converter through the second DC-link, the additional DC/DC converter can be designed for only a small portion of the nominal power. Moreover, no power needs to be processed by this converter when the output voltage level is equal to or higher than the peak of the AC input voltage. In addition, the additional DC/DC converter can be used as power decoupler, allowing a huge reduction of the required capacitance.

Figure 3A:
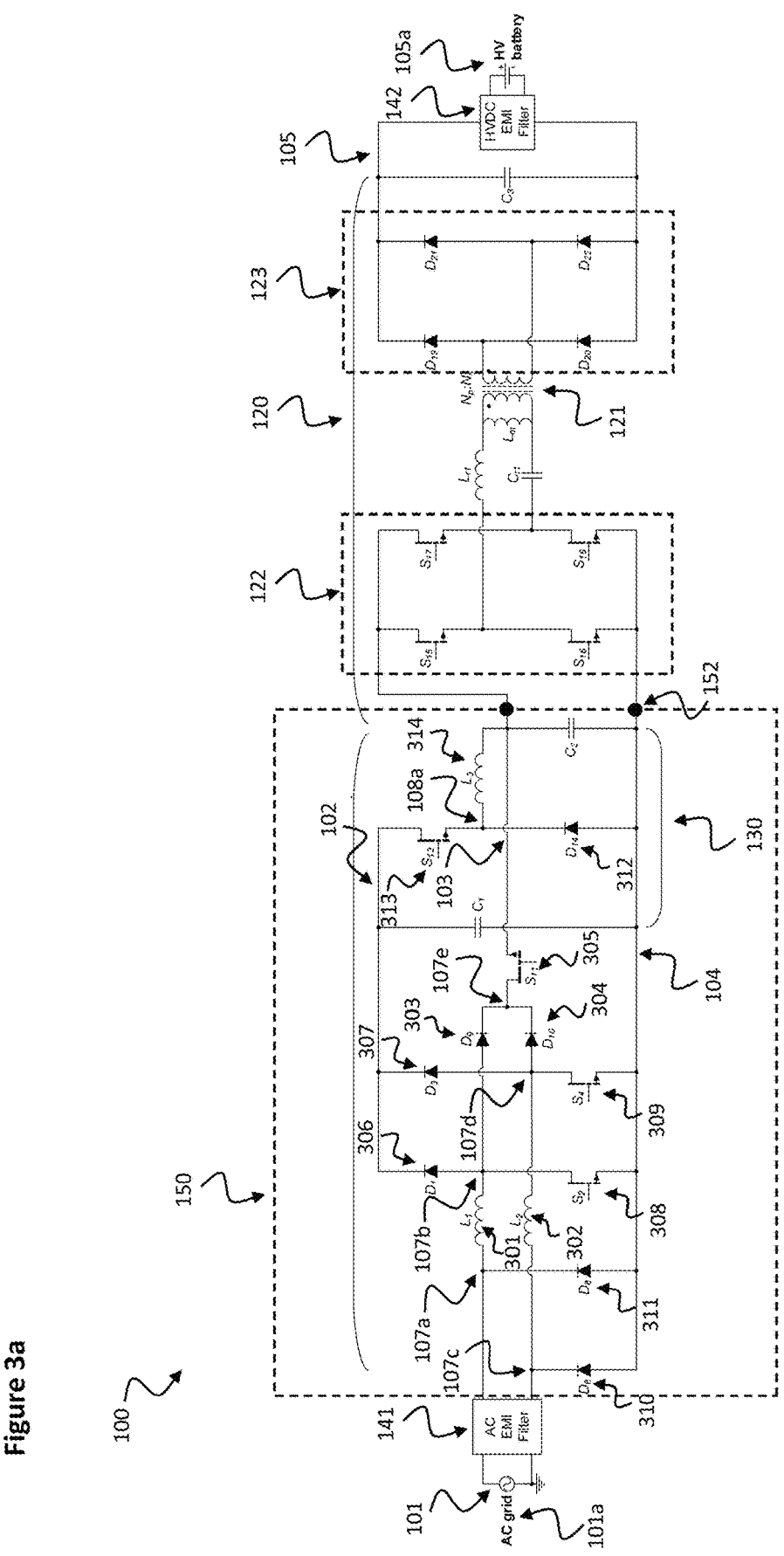
FIG. 3a shows another circuit diagram of the voltage converter circuit 100 according to the first embodiment.

In one embodiment of the disclosure, the system topology can be implemented by adopting a quasi 5-level PFC rectifier with common ground DC-link capacitors, a partial power Buck converter and a fixed frequency series resonant converter (SRC), as depicted in FIG. 3*a*.

Figure 3B:
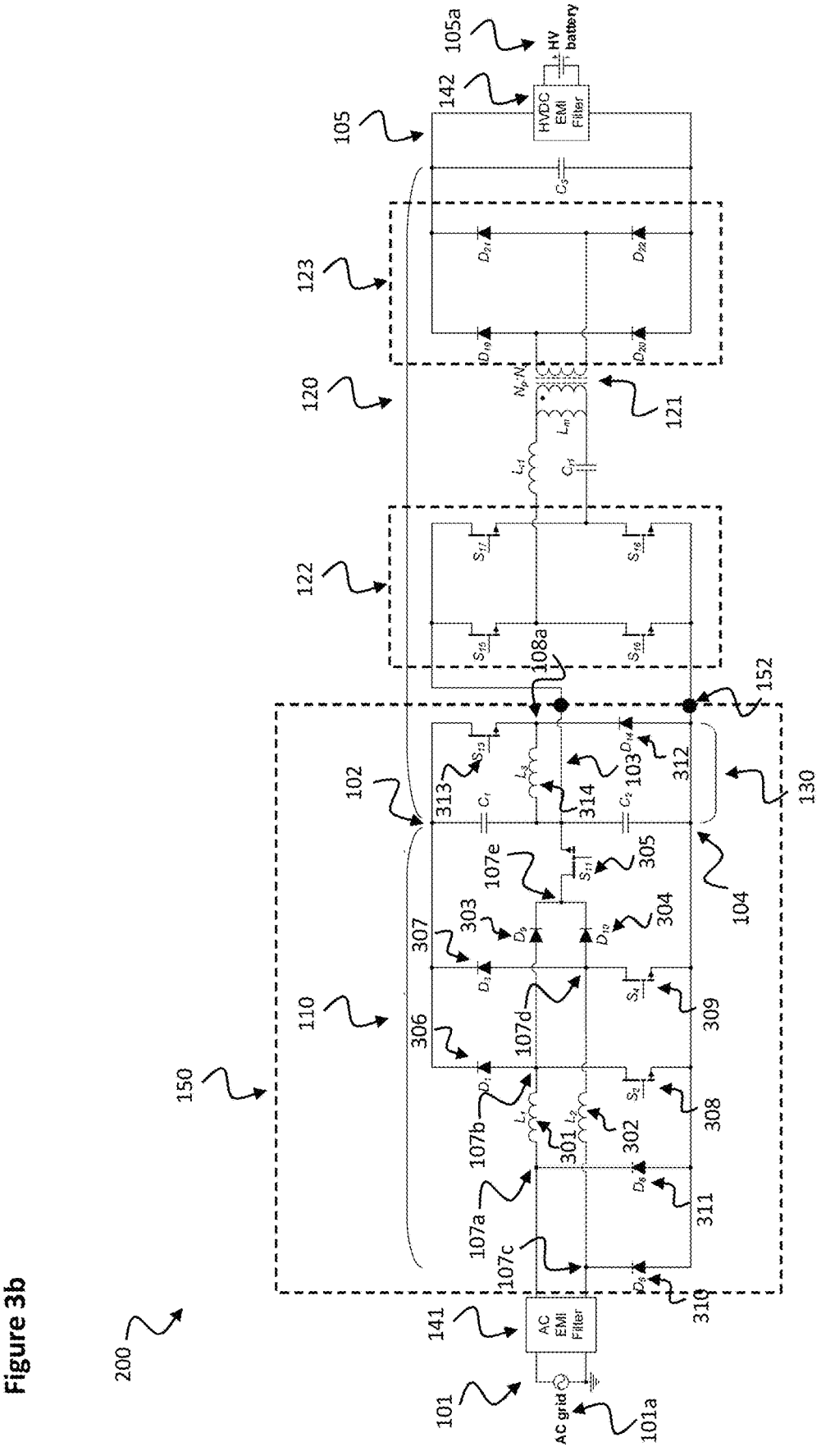
FIG. 3b shows another circuit diagram of the voltage converter circuit 200 according to a second embodiment.

In another embodiment of the disclosure, the system topology can be implemented by adopting a quasi 5-level PFC rectifier with split DC-link capacitors, a partial power Buck-Boost converter and a fixed frequency series resonant converter (SRC), as depicted in FIG. 3*b*. Both presented embodiments represent unidirectional solutions. Bidirectionality can be achieved, for instance, by replacing diodes by switches in both cases.

FIG. 3*a* shows another circuit diagram of the voltage converter circuit 100 according to the first embodiment.

The voltage converter circuit 100 corresponds to the voltage converter circuit 100 according to the first embodiment shown in FIG. 1*a*. But in FIG. 3*a* circuit details of the AC-DC conversion device 150 and the DC-DC conversion stage 120 are shown.

The AC-DC conversion device 150 comprises the following components: an inductor L1, 301, coupled between a first internal node 107*a* and a second internal node 107*b*; an inductor L2, 302, coupled between a third internal node 107*c* and a fourth internal node 107*d*; a diode D9, 303, coupled between the second internal node 107*b* and a fifth internal node 107*e*; a diode D10, 304, coupled between the fourth internal node 107*d* and the fifth internal node 107*e*; a switch S11, 305, placed between the fifth internal node 107*e* and the second DC terminal 103; a diode D1, 306, coupled between the second internal node 107*b* and the first DC terminal 102; a diode D3, 307, coupled between the fourth internal node 107*d* and the first DC terminal 102; a switch S2, 308, placed between the second internal node 107*b* and the third DC terminal 104; a switch S4, 309, placed between the fourth internal node 107*d* and the third DC terminal 104; a diode D6, 310, coupled between the third DC terminal 104 and the third internal node 107*c*; and a diode D8, 311, coupled between the third DC terminal 104 and the first internal node 107*a*.

The partial power DC-DC converter 130 comprises an internal node 108*a* connecting a switch S13, 313, an inductor L3, 314, and a diode D14, 312. The inductor L3, 314, is connected to the second DC terminal 103. The switch S13, 313 is connected to the first DC terminal 102. The diode D14, 312 is connected to the third DC terminal 104.

As described above, the voltage converter circuit 100 comprises an output 105 for providing an isolated output voltage 105*a*. The isolated output voltage 105*a* may be based on the second DC voltage 106 across the output 152 of the AC-DC conversion device 150.

The DC-DC conversion stage 120 is configured to transfer energy from the output 152 of the AC-DC conversion device 150 to the output 105 of the voltage converter circuit 100.

As described above, the DC-DC conversion stage 120 may be configured to operate in an open-loop mode without providing any regulation to the isolated output voltage 105*a*, or in a closed-loop mode providing regulation to the isolated output voltage 105*a*.

The DC-DC conversion stage 120 comprises an isolated DC-DC converter having a primary side 122 and a secondary side 123 coupled via a transformer 121. The primary side 122 has an input connected to the output 152 of the AC-DC conversion device 150. The secondary side 123 has an output connected to the output 105 of the voltage converter circuit 100 for providing the isolated output voltage 105*a*.

In the example of FIG. 3*a*, the primary side 122 may comprise an H-bridge with elements comprising of switches S15, S16, S17 and S18. The secondary side 123 may comprise an H-bridge with elements comprising of diodes D19, D20, D21 and D22.

FIG. 3*b* shows another circuit diagram of the voltage converter circuit 200 according to a second embodiment.

The voltage converter circuit 200 corresponds to the voltage converter circuit 200 according to the second embodiment shown in FIG. 1*b*. But in FIG. 3*b* circuit details of the AC-DC conversion device 150 and the DC-DC conversion stage 120 are shown.

The AC-DC conversion device 150 comprises the following components: an inductor L1, 301, coupled between a first internal node 107*a* and a second internal node 107*b*; an inductor L2, 302, coupled between a third internal node 107*c* and a fourth internal node 107*d*; a diode D9, 303, coupled between the second internal node 107*b* and a fifth internal node 107*c*; a diode D10, 304, coupled between the fourth internal node 107*d* and the fifth internal node 107*c*; a switch S11, 305, placed between the fifth internal node 107*e* and the second DC terminal 103; a diode D1, 306, coupled between the second internal node 107*b* and the first DC terminal 102; a diode D3, 307, coupled between the fourth internal node 107*d* and the first DC terminal 102; a switch S2, 308, placed between the second internal node 107*b* and the third DC terminal 104; a switch S4, 309, placed between the fourth internal node 107*d* and the third DC terminal 104; a diode D6, 310, coupled between the third DC terminal 104 and the third internal node 107*c*; and a diode D8, 311, coupled between the third DC terminal 104 and the first internal node 107*a*.

The partial power DC-DC converter 130 comprises an internal node 108*a* connecting a switch S13, 313, an inductor L3, 314, and a diode D14, 312. The inductor L3, 314, is connected to the second DC terminal 103. The switch S13, 313 is connected to the first DC terminal 102. The diode D14, 312 is connected to the third DC terminal 104.

As described above, the voltage converter circuit 100 comprises an output 105 for providing an isolated output voltage 105*a*. The isolated output voltage 105*a* may be based on the second DC voltage 106 across the output 152 of the AC-DC conversion device 150.

The DC-DC conversion stage 120 is configured to transfer energy from the output 152 of the AC-DC conversion device 150 to the output 105 of the voltage converter circuit 100.

As described above, the DC-DC conversion stage 120 may be configured to operate in an open-loop mode without providing any regulation to the isolated output voltage 105*a*, or in a closed-loop mode providing regulation to the isolated output voltage 105*a*.

The DC-DC conversion stage 120 comprises an isolated DC-DC converter having a primary side 122 and a secondary side 123 coupled via a transformer 121. The primary side 122 has an input connected to the output 152 of the AC-DC conversion device 150. The secondary side 123 has an output connected to the output 105 of the voltage converter circuit 100 for providing the isolated output voltage 105*a*.

In the example of FIG. 3*b*, the primary side 122 may comprise an H-bridge with elements comprising of switches S15, S16, S17 and S18. The secondary side 123 may comprise an H-bridge with elements comprising of diodes D19, D20, D21 and D22.

Figure 4A:
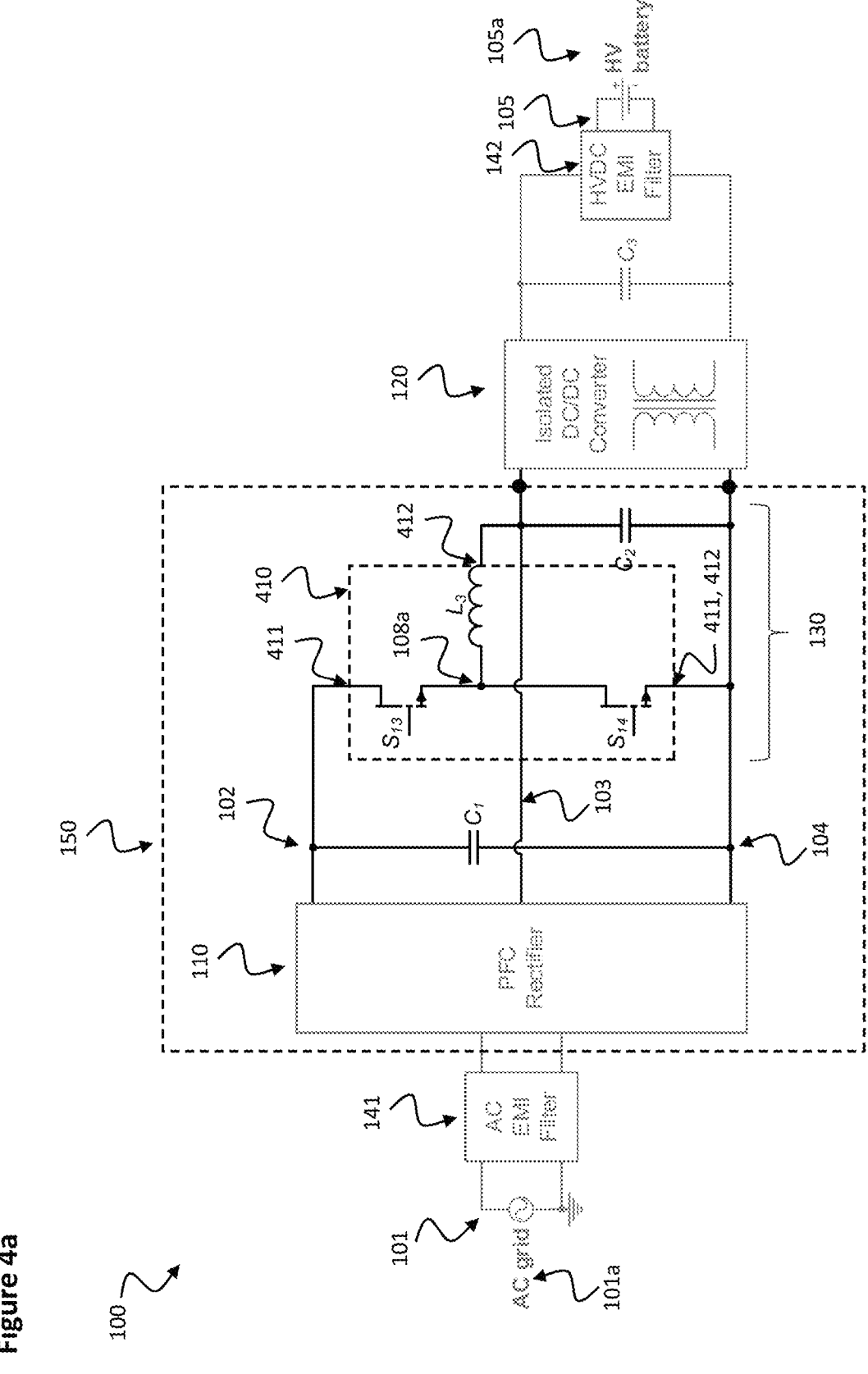
FIG. 4a shows another circuit diagram of the voltage converter circuit 100 according to the first embodiment.

FIG. 4*a* shows another circuit diagram of the voltage converter circuit 100 according to the first embodiment.

For the input stage, any PFC with two DC-links and ability to change the voltage across at least one of both can be selected for the voltage converter circuit 100, for instance the ones depicted in FIGS. 3*a* and 3*b*.

In the first embodiment of the voltage converter circuit 100, the DC-link capacitors are configured so that they share a common ground, as depicted in FIG. 1*a*. In this configuration, the partial power DC/DC converter can be configured as any step-down converter. FIG. 4*a* shows its preferable configuration as a bidirectional Buck converter. Besides the bidirectionality, it has the advantage of allowing the use of synchronous rectification to reduce the conduction losses on the Buck freewheeling diode.

The voltage converter circuit 100 corresponds to the voltage converter circuit 100 according to the first embodiment shown in FIGS. 1*a* and 3*a*. But in FIG. 4*a* circuit details of the AC-DC conversion device 150 are shown.

The partial power DC-DC converter 130 comprises a step-down converter 410 comprising: an input 411 connected between the first DC terminal 102 and the third DC terminal 104; and an output 412 connected between the second DC terminal 103 and third DC terminal 104.

The partial power DC-DC converter 130 comprises an internal node 108*a* connecting a switch S13, an inductor L3 and a switch S14. The inductor L3 is connected to the second DC terminal 103. The switch S13 is connected to the first DC terminal 102. The switch S14 is connected to the third DC terminal 104.

Figure 4B:
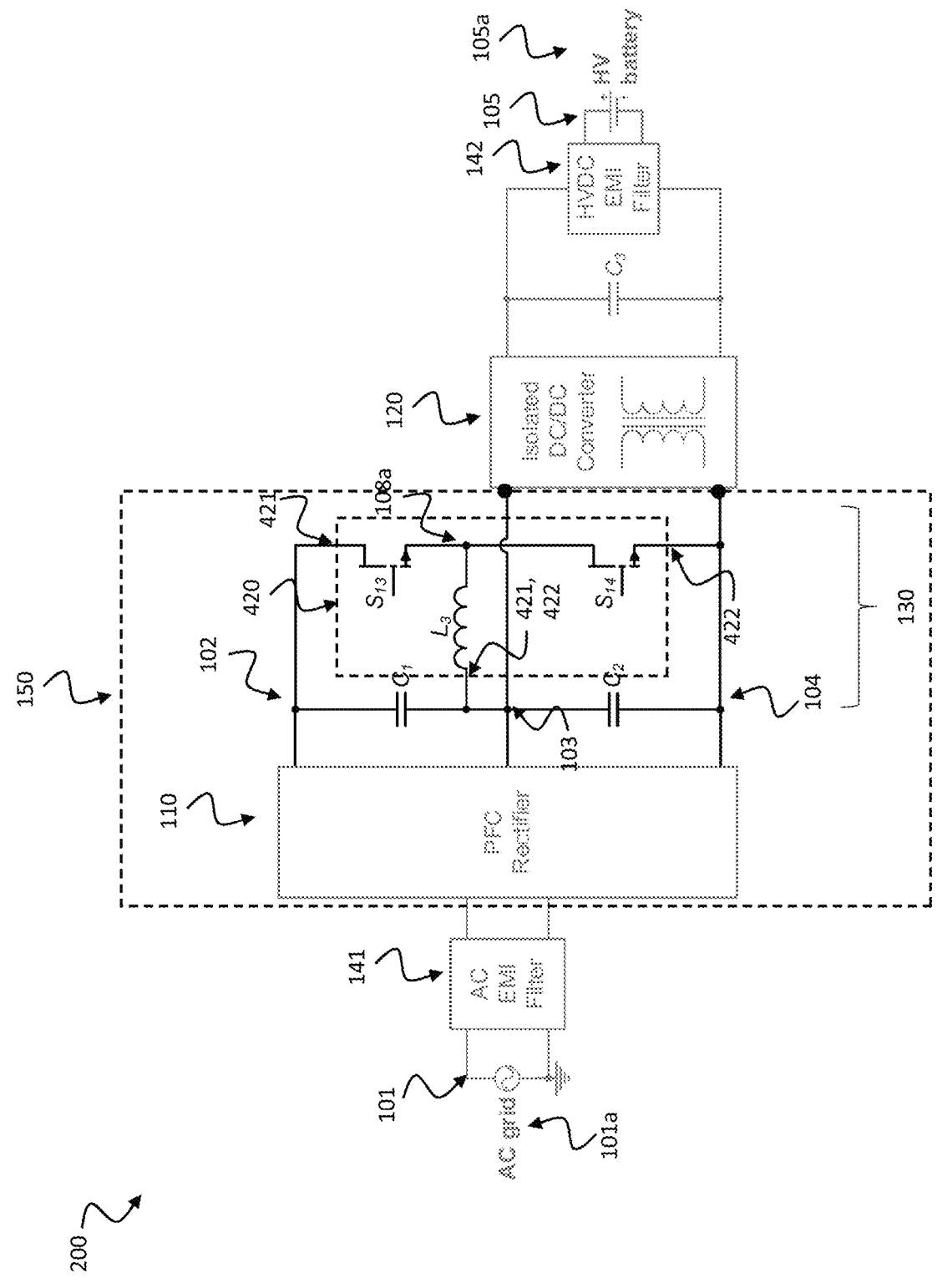
FIG. 4b shows another circuit diagram of the voltage converter circuit 200 according to a second embodiment.

FIG. 4*b* shows another circuit diagram of the voltage converter circuit 200 according to a second embodiment.

In the second embodiment of the voltage converter circuit 200, the DC-link capacitors are configured as a split DC-link, as depicted in FIG. 4*b*. In this configuration, the partial power DC/DC converter can be configured as any step-up/step-down converter. FIG. 4*b* shows its preferable configuration as a bidirectional Buck-Boost converter.

For the galvanic isolation, any isolated DC/DC converter can be adopted. Due to its high efficiency and compact size, a series resonant converter operating with fixed frequency at resonant frequency can preferably be adopted.

The voltage converter circuit 200 corresponds to the voltage converter circuit 200 according to the second embodiment shown in FIGS. 1*b* and 3*b*. But in FIG. 4*b* circuit details of the AC-DC conversion device 150 are shown.

The partial power DC-DC converter 130 comprises a step-up/step-down converter 420, comprising: an input 421 connected between the first DC terminal 102 and the second DC terminal 103; and an output 422 connected between the second DC terminal 103 and the third DC terminal 104.

The partial power DC-DC converter 130 comprises an internal node 108*a* connecting a switch S13, an inductor L3 and a switch S14. The inductor L3 is connected to the second DC terminal 103. The switch S13 is connected to the first DC terminal 102. The switch S14 is connected to the third DC terminal 104.

FIG. 5 shows a schematic diagram 500 illustrating an example of the operation voltages as well as required voltage gains for a voltage converter circuit according to the disclosure. FIG. 6 shows a schematic diagram 600 illustrating an exemplary voltage operation range of a voltage converter circuit according to the disclosure. In particular, the diagram 600 illustrates the power delivered to the first and second DC terminals according to the second DC-link voltage $V_{c2}$; The power processed by the partial power DC/DC converter is equal to the power delivered to the first DC terminal.

In the example depicted in FIGS. 5 and 6, the switching frequency of the DC/DC resonant converter (i.e., the DC-DC conversion stage 120 shown in FIGS. 1*a* and 1*b*) is kept constant at resonant frequency (with unity gain) and the voltage regulation is performed through the second DC-link voltage $V_{c2}$ controlled by the additional partial power DC/DC converter (i.e., partial power DC-DC converter 130 shown in FIGS. 1*a* and 1*b*).

In this design example, the transformer is constructed with turn ratios of 1:1, so that the operation range of the second DC-link voltage is from 250 V to 450 V. Within this operation range, the power flowing directly from PFC (i.e., AC-DC conversion stage 110 shown in FIGS. 1a and 1b) to the second DC-link varies from 66% and 100% of the nominal power, as represented by the continuous line in FIG. 6.

As consequence, the maximum processed power by the additional partial power DC/DC converter (i.e., partial power DC-DC converter 130 shown in FIGS. 1a and 1b) is around 34% of the nominal power. Moreover, no power needs to be processed by this converter from a certain output voltage level on, when the battery voltage is equal to or higher than the peak of the AC input voltage (here $V_{ipk}$=325 V).

Figure 7:
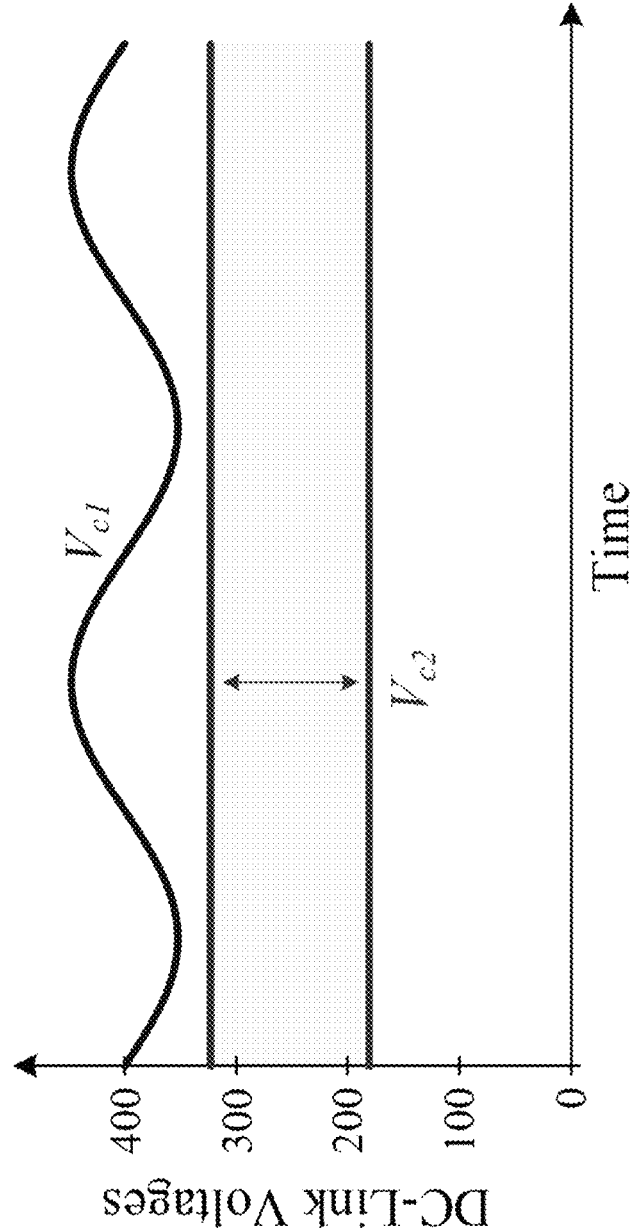
FIG. 7 shows a schematic diagram 700 illustrating operation voltages of a voltage converter circuit according to the disclosure.
Figure 8:
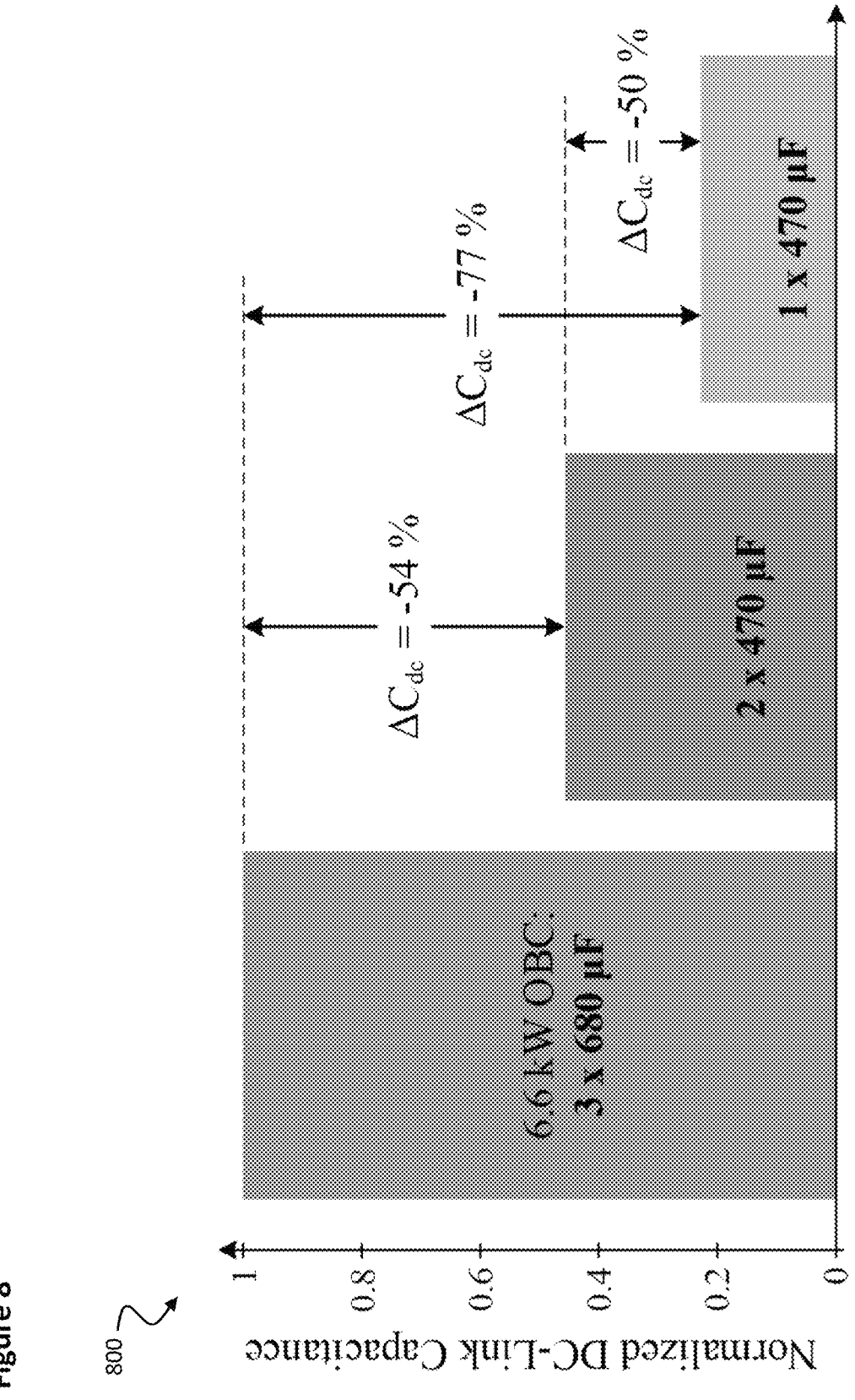
FIG. 8 shows a schematic diagram 800 illustrating required capacitances for a voltage converter circuit according to the disclosure in comparison with other voltage converter technologies.

FIG. 7 shows a schematic diagram 700 illustrating operation voltages of a voltage converter circuit according to the disclosure. FIG. 8 shows a schematic diagram 800 illustrating required capacitances for a voltage converter circuit according to the disclosure in comparison with other voltage converter technologies.

In another example of operation, as shown in FIGS. 7 and 8, the additional partial power DC/DC converter (i.e., partial power DC-DC converter 130 shown in FIGS. 1a and 1b) works as a power decoupler circuit, aiming to reduce the high capacitance value required due to the 100 Hz oscillating power from the AC input.

Therefore, the DC/DC converter is responsible for exchanging energy between the two DC-links capacitors $C_1$ and $C_2$, so that the voltage $V_{c2}$ (which is the input of the isolated DC/DC, e.g.: SRC, i.e., the DC-DC conversion stage 120 shown in FIGS. 1a and 1b) is regulated with very low ripple while $V_{c1}$ presents a relatively high 100 Hz ripple as can be seen in FIG. 7.

A reasonable reduction of 77% on the required capacitance can be obtained in comparison to the common converter solution, as illustrated in FIG. 8. Nevertheless, the additional DC/DC converter needs to be designed for higher power rating, not only due to the different voltage levels, but also because it needs to handle with almost full 100 Hz oscillating power.

Some of the devices and systems described in this disclosure offer an advantageous use of SRC working at resonant frequency instead of frequency modulated CLLC. The advantages are achieved by a) Open-loop operation (no complex control required); b) Higher efficiency over the entire voltage range; c) Simpler synchronous rectification (secondary always in phase with primary); d) Smaller optimized transformer (lower reactive power circulation); e) Resonant tank only on the primary side, due to good transformer coupling.

Further advantages are i) Lower current ripple at the AC side (quasi 5-level operation) for most of the points; ii) Design for minimized power of the additional DC/DC converter possible (for 1:1 operation, $V_{c2}$=$V_{bat}$); iii) Highly efficient symmetric 1:1 transformer design; and iv) Design for minimized required DC-link capacitance possible (DC/DC working as power decoupler), leading to a reduction of up to 77% compared to available solutions.

Figure 9:
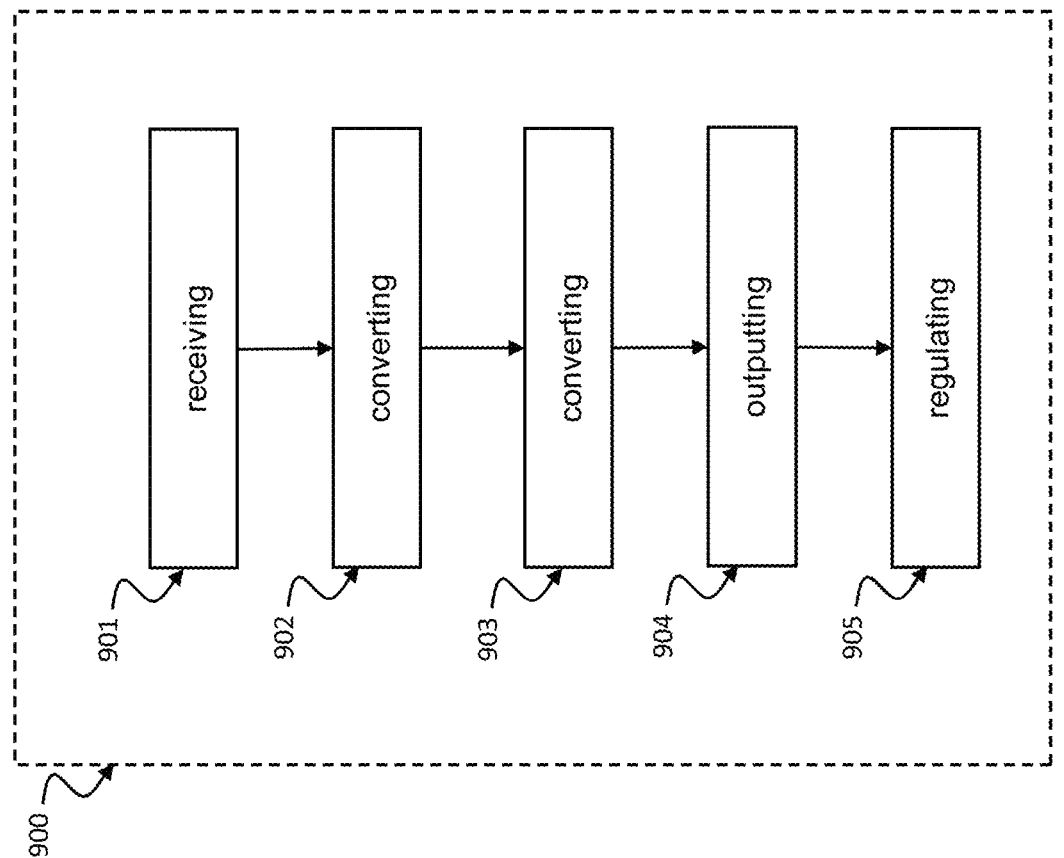
FIG. 9 shows a schematic diagram illustrating a method 900 for converting an AC voltage into a DC voltage according to an example of the disclosure.

FIG. 9 shows a schematic diagram illustrating a method 900 for converting an AC voltage into a DC voltage according to an example of the disclosure.

The method 900 can be used for converting an alternating current, AC, voltage 101a into a direct current, DC, voltage, using an AC-DC conversion device 150 as described above with respect to FIGS. 1a to 4b. The AC-DC conversion device 150 comprises an AC input terminal 101, an AC-DC conversion stage 110, and a partial power DC-DC converter 130 as described in the above sections.

The method 900 comprises receiving 901 the AC voltage 101a at an AC input terminal 101 of the AC-DC conversion device 150 as described above with respect to FIGS. 1a to 4b.

The method 900 comprises converting 902 the AC voltage 101a into a first DC voltage 106a by the AC-DC conversion device 150 as described above with respect to FIGS. 1a to 4b.

The method 900 comprises converting 903 the AC voltage 101a into a second DC voltage 106b by the AC-DC conversion device 150 as described above with respect to FIGS. 1a to 4b.

The method 900 comprises outputting 904 the second DC voltage 106b at an output 152 of the AC-DC conversion device 150 as described above with respect to FIGS. 1a to 4b.

The method 900 comprises regulating 905 the second DC voltage 106b by the partial power DC-DC converter 130 based on a required voltage across the output 152 of the AC-DC conversion device 150 as described above with respect to FIGS. 1a to 4b.

The method 900 may further comprise: providing an isolated output voltage 105a at an output 105 of a voltage converter circuit 100, 200 (i.e. a voltage converter circuit 100 according to the first embodiment of a voltage converter circuit 200 according to the second embodiment as described in the above sections) based on the second DC voltage 106 across the output 152 of the AC-DC conversion device 150.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the disclosure beyond those described herein. While the disclosure has been described with reference to one or more particular embodiments, those skilled in the art recognize that many changes may be made thereto without departing from the scope of the disclosure. It is therefore to be understood that within the scope of the appended claims and their equivalents, the disclosure may be practiced otherwise than as specifically described herein.

What is claimed is:

1. An alternating current (AC)-direct current (DC) conversion device for converting an (AC) voltage into a direct current (DC) voltage, the AC-DC conversion device comprising:

an AC input terminal configured to receive an AC voltage;
an AC-DC conversion stage configured to:
    convert the AC voltage into a first DC voltage;
    convert the AC voltage into a second DC voltage; and
    output the second DC voltage at an output of the AC-DC conversion device;
a first DC terminal, a second DC terminal, and a third DC terminal, wherein the first DC voltage is provided between the first DC terminal and the third DC terminal and corresponds to a voltage across a first capacitor, and wherein the second DC voltage is provided between the second DC terminal and the third DC terminal and corresponds to a voltage across a second capacitor; and
a partial power DC-DC converter configured to regulate the second DC voltage across the second capacitor based on a required voltage across the output of the AC-DC conversion device by exchanging energy between the first capacitor and the second capacitor.

2. The AC-DC conversion device of claim 1, wherein the first DC terminal is coupled via the first capacitor to the third DC terminal and the second DC terminal is coupled via the second capacitor to the third DC terminal.

3. The AC-DC conversion device of claim 1, wherein the AC-DC conversion device further comprises:

a first inductor coupled between a first internal node and a second internal node;
a second inductor coupled between a third internal node and a fourth internal node;
a first diode coupled between the second internal node and a fifth internal node;
a second diode coupled between the fourth internal node and the fifth internal node;
a first switch placed between the fifth internal node and the second DC terminal;
a third diode coupled between the second internal node and the first DC terminal;
a fourth diode coupled between the fourth internal node and the first DC terminal;
a second switch placed between the second internal node and the third DC terminal;
a third switch placed between the fourth internal node and the third DC terminal;
a fifth diode coupled between the third DC terminal and the third internal node; and
a sixth diode coupled between the third DC terminal and the first internal node.

4. The AC-DC conversion device of claim 1, wherein the AC-DC conversion device comprises:

a first inductor coupled between a first internal node and a second internal node;
a second inductor coupled between a third internal node and a fourth internal node;
a first diode coupled between the second internal node and a fifth internal node;

a second diode coupled between the fourth internal node and the fifth internal node;
a first switch placed between the fifth internal node and the second DC terminal;
a third diode coupled between the second internal node and the first DC terminal;
a fourth diode coupled between the fourth internal node and the first DC terminal;
a second switch placed between the second internal node and the third DC terminal;
a third switch placed between the fourth internal node and the third DC terminal;
a fifth diode coupled between the third DC terminal and the third internal node; and
a sixth diode coupled between the third DC terminal and the first internal node.

5. The AC-DC conversion device of claim 1, wherein the partial power DC-DC converter comprises:

a first terminal connected to the first DC terminal of the AC-DC conversion device;
a second terminal connected to the second DC terminal of the AC-DC conversion device; and
a third terminal connected to the third DC terminal of the AC-DC conversion device.

6. The AC-DC conversion device of claim 1, wherein the partial power DC-DC converter comprises:

a first terminal connected to the first DC terminal of the AC-DC conversion device;
a second terminal connected to the second DC terminal of the AC-DC conversion device; and
a third terminal connected to the third DC terminal of the AC-DC conversion device.

7. The AC-DC conversion device of claim 1, wherein the partial power DC-DC converter comprises a step-down converter comprising:

an input connected between the first DC terminal and the third DC terminal; and
an output connected between the second DC terminal and third DC terminal.

8. The AC-DC conversion device of claim 1, wherein the partial power DC-DC converter comprises a step-down converter, the step-down converter comprising:

an input connected between the first DC terminal and the third DC terminal; and
an output connected between the second DC terminal and third DC terminal.

9. The AC-DC conversion device of claim 3, wherein the partial power DC-DC converter comprises a step-down converter, the step-down converter comprising:

an input connected between the first DC terminal and the third DC terminal; and
an output connected between the second DC terminal and third DC terminal.

10. The AC-DC conversion device of claim 1, wherein the partial power DC-DC converter comprises a step-up/step-down converter, the step-up/step- down converter comprising:

an input connected between the first DC terminal and the second DC terminal; and
an output connected between the second DC terminal and the third DC terminal.

11. A voltage converter circuit, comprising:

an AC-DC conversion device according to claim 1; and
an output for providing an isolated output voltage based on the second DC voltage across the output of the AC-DC conversion device.

12. The voltage converter circuit of claim 11, comprising:

a DC-DC conversion stage being configured to transfer energy from the output of the AC-DC conversion device to the output of the voltage converter circuit.

13. The voltage converter circuit of claim 12, wherein the DC-DC conversion stage is configured to operate in an open-loop mode without providing any regulation to the isolated output voltage, or in a closed-loop mode providing regulation to the isolated output voltage.

14. The voltage converter circuit of claim 11, wherein the DC-DC conversion stage comprises an isolated DC-DC converter, the isolated DC-DC converter comprising a primary side and a secondary side coupled via a transformer, wherein the primary side has an input connected to the output of the AC-DC conversion device; and wherein the secondary side has an output connected to the output of the voltage converter circuit for providing the isolated output voltage.

15. The voltage converter circuit of claim 11, further comprising:

an AC electromagnetic interference (EMI) filter coupled to the AC input terminal, the AC EMI filter being configured to suppress electromagnetic interference from the AC input terminal; and a DC EMI filter coupled to the output of the voltage converter circuit, the DC EMI filter configured to suppress electromagnetic interference from the output of the voltage converter circuit.

16. A method for converting an alternating current (AC) voltage into a direct current (DC) voltage via an AC-DC conversion device comprising an AC input terminal, an AC-DC conversion stage, a first DC terminal, a second DC terminal, a third DC terminal, and a partial power DC-DC converter, the method comprising:

receiving the AC voltage at an AC input terminal of the AC-DC conversion device;

converting the AC voltage into a first DC voltage by the AC-DC conversion device, wherein the first DC voltage is provided between the first DC terminal and the third DC terminal and corresponds to a voltage across a first capacitor;

converting the AC voltage into a second DC voltage by the AC-DC conversion device, wherein the second DC voltage is provided between the second DC terminal and the third DC terminal and corresponds to a voltage across a second capacitor;

outputting the second DC voltage at an output of the AC-DC conversion device; and regulating the second DC voltage across the second capacitor by the partial power DC-DC converter based on a required voltage across the output of the AC-DC conversion device by exchanging energy between the first capacitor and the second capacitor.

17. The method of claim 16, further comprising providing an isolated output voltage at an output of a voltage converter circuit based on the second DC voltage across the output of the AC-DC conversion device.

* * * * *